United States Patent [19]

Fukui

[11] 4,260,998
[45] Apr. 7, 1981

[54] RECORDING DEVICE

[75] Inventor: Takashi Fukui, Minami-ashigara, Japan

[73] Assignee: Fuji Photo Film Co., Ltd., Kanagawa, Japan

[21] Appl. No.: 100,109

[22] Filed: Dec. 4, 1979

[30] Foreign Application Priority Data

Dec. 23, 1978 [JP] Japan .................................. 53/162421

[51] Int. Cl.³ ........................ G01D 9/42; G01D 15/24
[52] U.S. Cl. ..................................... 346/108; 346/138;
358/290; 354/5
[58] Field of Search ................ 346/108, 138; 358/290;
354/5, 63, 110

[56] References Cited

U.S. PATENT DOCUMENTS

| | | | |
|---|---|---|---|
| 2,532,799 | 12/1950 | Young | 346/108 UX |
| 3,707,723 | 12/1972 | Levene | 346/108 |
| 3,823,276 | 7/1974 | Maslowski et al. | 358/290 X |

FOREIGN PATENT DOCUMENTS 326937  3/1930  United Kingdom ..................... 358/290

*Primary Examiner*—George H. Miller, Jr.
*Attorney, Agent, or Firm*—Harold L. Stults; Pasquale A. Razzano

[57] ABSTRACT

Image signals received by a facsimile receiver are stored in a scan converter. The scan converter repeatedly reads out the stored image signals and supplies them to an acousto-optic modulator. The acousto-optic modulator modulates a recording laser beam with the supplied image signals. The modulated laser beam is deflected by a deflector to scan a photosensitive recording medium to record an image thereon. The scan converter first reads out a first part of the stored image signals corresponding to the first scan line. After the first part of the stored image signals has been recorded on one photosensitive recording medium, the scan converter again reads out the same part of the stored image signals and the laser beam modulated with the same image signals is caused to scan another photosensitive recording medium. After the first part of the stored image signals corresponding to the first scan line has been recorded on all the photosensitive recording media, a second part of the stored image signals corresponding to the second scan line is read out from the scan converter to be recorded on the photosensitive recording media. Thus, all the stored image signals of an image are recorded on all the photosensitive recording media in parallel, whereby a plurality of hard copies of an image can be obtained from the same image signals.

6 Claims, 2 Drawing Figures

RECORDING DEVICE

BACKGROUND OF THE INVENTION

1. Field of the Invention

This invention relates to a recording device capable of making a plurality of hard copies of an image from the same input image signals. The recording device of this invention is particularly useful for a newspaper office to record image signals received by a facsimile receiver on a plurality of photosensitive printing plate materials by use of a recording scanning light beam modulated by the image signals.

2. Description of the Prior Art

Conventionally, a plurality of printing plates bearing an image carried by image signals received by a facsimile receiver has been prepared by first recording the received signals on a reflection type photosensitive recording material, photographically transferring the image recorded thereon to a lith (lithographic) film, and finally repeatedly printing the lith film onto a plurality of printing plate materials, or by directly recording the received signals on a lith film and repeatedly printing the lith film onto a plurality of printing plate materials.

However, the conventional methods of preparing a plurality of printing plates are time consuming and therefore are not suitable particularly for a newspaper office which is required to report news as quickly as possible.

Recently, there has been developed a recording system in which an image carried by the signals received by a facsimile receiver is directly reproduced onto a printing plate material utilizing a laser beam, such as "Laserite" of EOCOM Corp. in U.S.A.

However, the recording device is not suitable for making a plurality of printing plates from the same input image signals since it is not provided with a memory system for storing input image signals.

SUMMARY OF THE INVENTION

In light of the foregoing observations and description, the primary object of the present invention is to provide a recording device which is capable of making a plurality of hard copies or printing plates from the same input image signals in a relatively short time.

In the recording device of the present invention, input image signals are stored in a scan converter. The scan converter reads out the stored image signals and supplies them to an acousto-optic modulator which modulates a recording light beam in accordance with the signals. The modulated recording light beam is deflected by a deflector to scan a photosensitive recording medium. The scan converter repeatedly reads out the stored image signals to record them on a plurality of photosensitive recording media.

In one aspect of the present invention, a part of the stored image signals corresponding to the first scan line is first repeatedly read out from the scan converter so that the same image signals are recorded in parallel on all the photosensitive recording media. After the part of the stored image signals corresponding to the first scan line has been recorded on all the photosensitive recording media, the part of the stored image signals corresponding to the next or the second scan line is repeatedly read out from the scan converter to be received in parallel on all the photosensitive media. Thus, all the stored image signals are recorded in parallel on all the photosensitive recording media.

In the other aspect of the present invention, the stored image signals corresponding to the entire image of one frame are continuously read out from the scan converter to be recorded on a first photosensitive recording medium. After the entire image has been recorded on the first photosensitive recording medium, the same image signals are again continuously read out from the scan converter to be recorded on the next or the second photosensitive recording medium. Thus, all the stored image signals are recorded in series on all the photosensitive recording media.

The first system will be referred to as "parallel recording system" and the latter system will be referred to as "serial recording system" hereinafter.

DESCRIPTION OF THE PREFERRED EMBODIMENT

Figure 1:
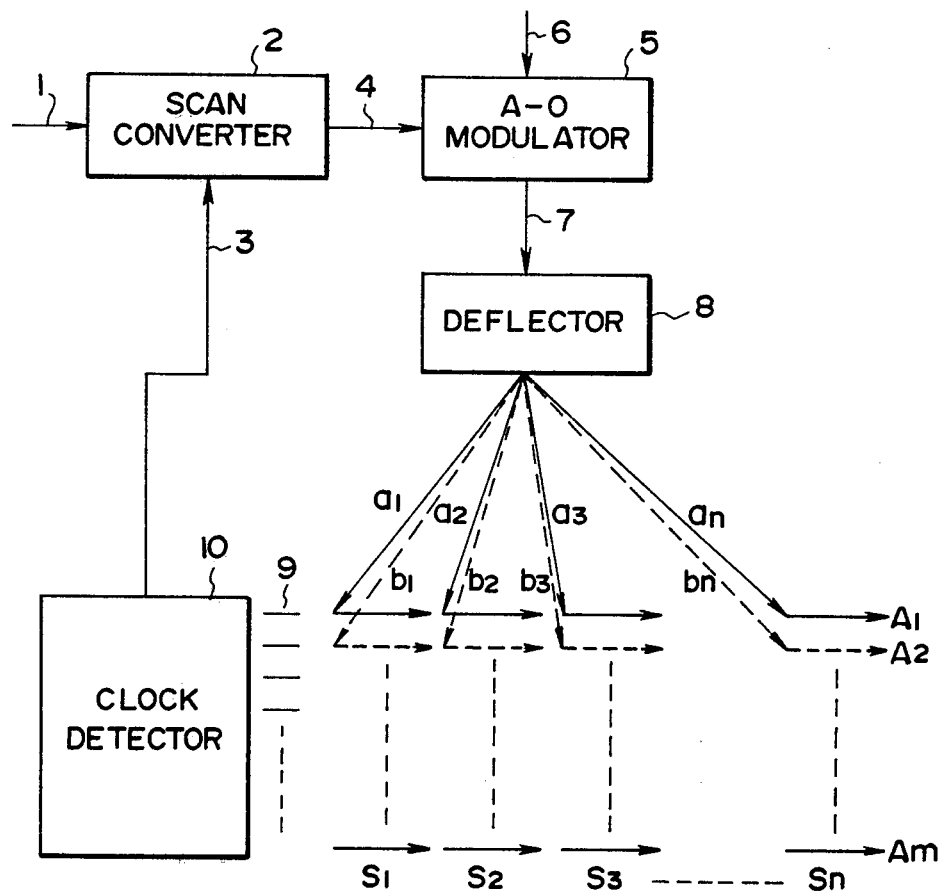
FIG. 1 is block diagram schematically illustrating the principle of the present invention, and FIG. 2 schematically shows a recording device in accordance with an embodiment of the present invention.

Referring to FIG. 1, input image signals 1 are stored in a scan converter 2. The scan converter 2 reads out the stored image signals and supplies them to an acousto-optic modulator 5 as indicated by a line 4. The acousto-optic modulator 5 modulates a recording light beam 6 with the supplied image signals. The modulated recording light beam 7 is deflected by a deflector 8 to scan a plurality of photosensitive recording media S1-Sn. The input image signals may be image signals received by a facsimile receiver, image signals of a television system or other image signals obtained through raster scan.

In the parallel recording system, a first part of the stored image signals corresponding to a first scan line A1 is supplied to the acousto-optic modulator 5 from the scan converter 2. Accordingly, the recording light beam 6 is modulated by the acousto-optic modulator 5 with the first part of the stored image signals and swept across the first photosensitive recording medium S1 by the deflector 8 as indicated by an arrow a1. After the first part of the stored image signals has been recorded on the first photosensitive recording medium S1, a gate signal is supplied to the scan converter 2 from a clock detector 10 as indicated by a line 3 to cause it to supply again the first part of the stored image signals to the acousto-optic modulator 5. At this time, the modulated recording light beam 7 is swept across the second photosensitive medium S2 as indicated by an arrow a2. When the first part of the stored image signals is thus recorded on all the photosensitive recording media S1-Sn as indicated by arrows a1-an, the clock detector 10 supplies a signal to the scan converter 2 to cause it to read out the next or the second part of the stored image signals corresponding to the next scan line A2. The modulated light beam 7 modulated with the second part of the stored image signals is one pitch deflected to scan the second scan line A2 on the recording media S1-Sn. Thus, the second part of the stored image signals is recorded on all the recording media S1-Sn in a similar manner as indicated by arrows b1-bn. Thus, all the stored image signals are recorded in parallel on all the photosensitive recording media S1-Sn.

In the serial recording system, after the first part of the stored image signals has been recorded on the first photosensitive recording medium S1, the second part is recorded on the first photosensitive recording medium S1. When all the stored image signals are recorded on the first photosensitive recording medium S1, the scan converter 2 again reads out the stored image signals to record them on the next or the second photosensitive recording medium S2. Thus, all the stored image signals are recorded in series on all the photosensitive recording media S1–Sn. In the serial recording system, it is preferred to record the stored image signals on even-numbered photosensitive media from the last part thereof to save the time for returning the deflector 8 to the uppermost or the first scan line on each photosensitive recording medium.

Figure 2:
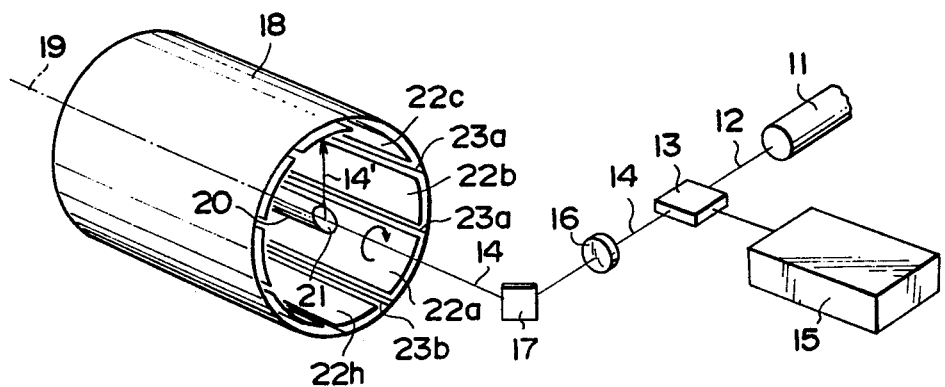

FIG. 2 schematically shows a recording device in accordance with an embodiment of the present invention. The recording device of this embodiment is arranged to make eight hard copies from the same image signals. As shown in FIG. 2, eight photosensitive recording media 22 (22a–22h) are supported in parallel on the inner surface of a cylindrical support member 18. A laser source 11 emits a laser beam 12 as a recording light beam. The laser beam 12 is modulated by an acousto-optic modulator 13 controlled by signals from a scan converter 15. The modulated laser beam 14 transmits through a lens system 16 and is reflected first by a mirror 17 and second by an end face 21 of a rotating shaft 20 to impinge upon the photosensitive recording media 22. The rotating shaft 20 is disposed coaxially with the cylindrical support member 18 and is rotated about the axis 19 thereof. The end face 21 of the rotating shaft 20 forms a reflecting surface inclined at 45° with respect to the axis 19. The modulated laser beam 14 is reflected by the mirror 17 to impinge upon the end face 21 of the rotating shaft 20 travelling along the axis 19 and then reflected by the end face 21 in the direction perpendicular to the common axis 19 as indicated by a line 14'. The lens system 16 expands the diameter of the modulated laser beam 14 and focuses it to a small spot on the photosensitive recording media 22. With this arrangement the modulated laser beam 14 is swept transversely of the photosensitive recording media 22 supported on the inner surface of the cylindrical support member 18 by rotating the rotating shaft 20 about the axis 19. The rotating shaft 20 is slidable back and forth with respect to the support member 18 along the axis 19 for a purpose which will be described hereinbelow.

A reference mark 23b in the form of double lines extending between adjacent photosensitive recording media 22 over the entire length thereof is provided between the first and eighth photosensitive media 22a and 22h. Reference marks 23a in the form of a number of separate lines extending over the entire length of the photosensitive recording media 22 are provided between the adjacent photosensitive recording media 22a to 22h except between the first and eighth of them.

As described above, the input image signals are once stored in the scan converter 15, and the acousto-optic modulator 13 modulates the laser beam 12 with the signals supplied from the scan converter 15.

When the parallel recording system is employed, the scan converter 15 first supplies a part of the stored image signals corresponding to the first scan line to the acousto-optic modulator 13. The modulated laser beam 14 modulated with the first part of the stored image signals scans the first photosensitive recording medium 22a by rotating the rotating shaft 20 in the counterclockwise direction. Thus, the first part of the stored image signals is recorded on the first photosensitive recording medium 22a. When the modulated laser beam 14 impinges upon the reference mark 23a between the first and second photosensitive recording media 22a and 22b, a pulse signal is generated to be forwarded to the scan converter 15 whereby the scan converter 15 reads out the same part of the stored image signals. Thus, the same part of the stored image signals are recorded on the second photosensitive recording medium 22b.

Thus, the first part of the stored image signals corresponding to the first scan line is recorded on all the photosensitive recording media 22a–22h. When the modulated laser beam 14 impinges upon the reference mark 23b between the first and eighth photosensitive recording media 22a and 22h, a pulse signal which commands the scan converter 15 to read out the second part of the stored image signals corresponding to the next or the second scan line is generated and forwarded thereto. At the same time the rotating shaft 20 is slid along the axis 19 by one pitch of scanning lines. The rotating shaft 20 is further rotated in the counterclockwise direction to record the second part of the stored image signals corresponding to the second scan line on all the photosensitive recording media 22a to 22h. The above described operation is repeated and all the stored image signals are recorded on all the photosensitive recording media 22a to 22h in parallel. Thus, eight hard copies can be made from the same input image signals.

When the serial recording system is employed, the stored image signals corresponding to the entire image of one frame are continuously read out from the scan converter 15 and the rotating shaft 20 is swung back and forth transversely of the first photosensitive recording medium 22a to record all the image signals continuously thereon. The rotating shaft 20 is slid along the axis 19 with respect to the cylindrical support member 18 each time it is returned to the original angular position to cause the scanning laser beam 14' reflected by the end face 21 thereof to advance by one pitch of scanning lines.

After all the stored image signals have been recorded on the first photosensitive recording medium 22a, the same image signals are read out from the scan converter 15 to be continuously recorded on the second photosensitive recording medium 22b. At this time it is preferred that the image signals are read out from the last part thereof corresponding to the last scan line to the first part corresponding to the first scan line and the scanning laser beam 14' is caused to advance from left to right in FIG. 2, whereby the time required for returning the rotating shaft 20 to the original axial position can be saved. Thus, the same image signals are recorded on all the photosensitive recording media 22a–22h in series.

In the place of the cylindrical support member 18 a tubular support member having an octagonal inner surface in cross-section may be used. Further, the photosensitive recording media may be supported on a support member in the form of a flat bed. However, the tubular support member having an inner surface which is cylindrical or polygonal in cross section should be designed to reduce the space occupied thereby. For example, in order to support eight photosensitive recording media having a width of 42 cm which is substantially equal to that of an ordinary newspaper on a flat bed type support member, the support member should have a width of at least 336 cm (42×8). On the other hand, the cylindrical support member as shown in FIG. 2 may only have a diameter of 120 cm in order to support eight photosensitive recording media of the same width.

I claim:

1. A recording device for making a plurality of hard copies from a single input image signal comprising a scan converter which stores the input image signal and repeatedly reads out the signal, an acousto-optic modulator which is supplied with the stored image signal from the scan converter and modulates a recording light beam with the supplied image signal, and a deflector which deflects the modulated recording light beam to scan a plurality of photosensitive recording media to record the image signal thereon.

2. A recording device as defined in claim 1 in which said scan converter first supplies a first part of the stored image signal corresponding to the first scan line to the acousto-optic modulator so that the same image signal is recorded on all the photosensitive recording media and the scan converter supplies a second of the stored image signal corresponding to the next scan line after the first part of the stored image signal corresponding to the first scan line has been recorded on all the photosensitive recording media, all the stored image signal thus being recorded on all the photosensitive recording media in parallel.

3. A recording device as defined in claim 1 in which the stored image signal corresponding to the entire image of one frame are continuously supplied to the acousto-optic modulator from the scan converter to be recorded on a first photosensitive recording medium and then the same image signal is again supplied to the acousto-optic modulator to be recorded on the next photosensitive medium after the entire image has been recorded on the first photosensitive recording medium, all the stored image signal thus being recorded in series on all the photosensitive recording media.

4. A recording device as defined in claim 3 in which, when recording on the even-numbered photosensitive recording media, the stored image signal is read out from the last part thereof corresponding to the last scan line and the modulated light beam is advanced in the direction opposite to the direction in which the modulated light beam is advanced when recording on the odd-numbered photosensitive recording media.

5. A recording device as defined in claim 2 or 3 in which said photosensitive recording media are supported on the inner surface of a cylindrical support member and the modulated light beam is swept and advanced by means of a reflecting surface which is rotatable about the longitudinal axis of the cylindrical support member and is slidable along the longitudinal axis with respect to the support member.

6. A recording device as defined in claim 1 in which said recording light beam is a laser beam.

* * * * *